Aug. 23, 1960   C. J. KORANDA ET AL   2,950,143
COMBINATION DISCHARGE OUTLET FOR HOPPER CARS
Filed March 24, 1958   12 Sheets-Sheet 1

INVENTORS
Clarence J. Koranda,
BY William E. Fritz
Robert R. Lockwood
ATTY

Aug. 23, 1960  C. J. KORANDA ET AL  2,950,143
COMBINATION DISCHARGE OUTLET FOR HOPPER CARS
Filed March 24, 1958  12 Sheets-Sheet 7

INVENTORS.
Clarence J. Koranda,
BY William E. Fritz,
Robert R. Lockwood
Atty.

United States Patent Office 2,950,143
Patented Aug. 23, 1960

2,950,143

COMBINATION DISCHARGE OUTLET FOR HOPPER CARS

Clarence J. Koranda, Western Springs, and William E. Fritz, Hinsdale, Ill., assignors to Enterprise Railway Equipment Company, Chicago, Ill., a corporation of Illinois Filed Mar. 24, 1958, Ser. No. 723,329

17 Claims. (Cl. 302—52)

This invention relates to an improved load discharging hopper of the type generally employed in railroad cars and the like and has particular reference to a type of hopper having a discharge area bordered by a frame which includes a discharge opening having a sliding gate for closing the opening and controlling the discharge of lading therethrough. This application is a continuation-in-part of application Serial No. 656,121, filed April 30, 1957, now abandoned.

Hopper cars are used extensively in railroad service for handling finely comminuted commodities in bulk and, although a widely accepted method of unloading is through discharge opening by gravity, there are certain commodities which lend themselves to efficient unloading by some form of pneumatic system.

In order to adapt gravity unloading cars to pneumatic unloading, it is a common expedient to employ auxiliary hoppers having the necessary arrangements for entraining material through an air stream and connecting the auxiliary hopper with the hopper car discharge opening. The employment of an auxiliary hopper which must be fitted into place, however, requires the opening of the gate and exposes the lading to possible contamination due to the adherence of contaminating matter to the underside of the gate and to the walls of the frame adjacent the opening.

It is therefore an object of this invention to provide a hopper which may be selectively unloaded either by gravity, through the discharge opening, or by entraining the lading in the car in an air stream and unloading pneumatically.

In the operation of railroad cars it is of importance to provide a car which can be readily unloaded at destination by either one of the two methods, aforementioned, without any prearrangement of parts at the loading station and it is to this end that this invention is directed.

Other and more specific objects of the invention are: To provide a conduit system with the parts so related to each other and to the other parts of the hopper as to provide for entrainment of lading and the ejection of same in an effective manner; to provide suitable closures for the ends of the conduits; to provide a novel graduating cover to control the volume of atmospheric air entering the conduit system; to provide a conduit system which may be fabricated as a complete assembly for application as a self-contained unit to a gravity discharge outlet and function as an integral part of the outlet; and to provide a conduit system which may be applied to and form an integral part of the discharge outlet.

Additional objects of the invention are: To provide a hood shaped member within the hopper as a part of the conduit system having its lower edges spaced from the upper surface of the gate; to move a portion of the hood shaped member out of the path of the lading being discharged through the discharge area when the gate is opened; to provide for moving this portion of the hood shaped member as a result of movement of the gate between open and closed positions; to employ a pair of hinged plates to form the inverted V-shaped movable portion and to bias them apart against the lading being discharged through the discharge area when the gate is opened; and to employ for the movable portion a rigid inverted V-shaped member slidable underneath one end of the hood shaped member as a result of opening movement of the gate.

For further comprehension of the invention reference may be had to the accompanying drawings wherein the improvement is shown as applied to the discharge hopper of a railway car.

In the drawings the car structure is indicated by a center sill 10 and by the car side wall 11. Interposed between the center sill 10 and side wall is a four sided hopper including inner and outer side walls indicated at 12 and 13, respectively, which meet with oppositely sloping end walls 14 and 15 to complete the four sides of the hopper and provide a discharge area between said walls. The lower portion of the hopper is fitted with a frame 16 which is preferably formed of a heavy cast steel member and includes side walls 17 and 18 which overlie the respective walls 12 and 13 of the hopper and end walls 19 and 20 which overlie the respective walls 14 and 15 of the hopper.

Figures 2, 4, 6:
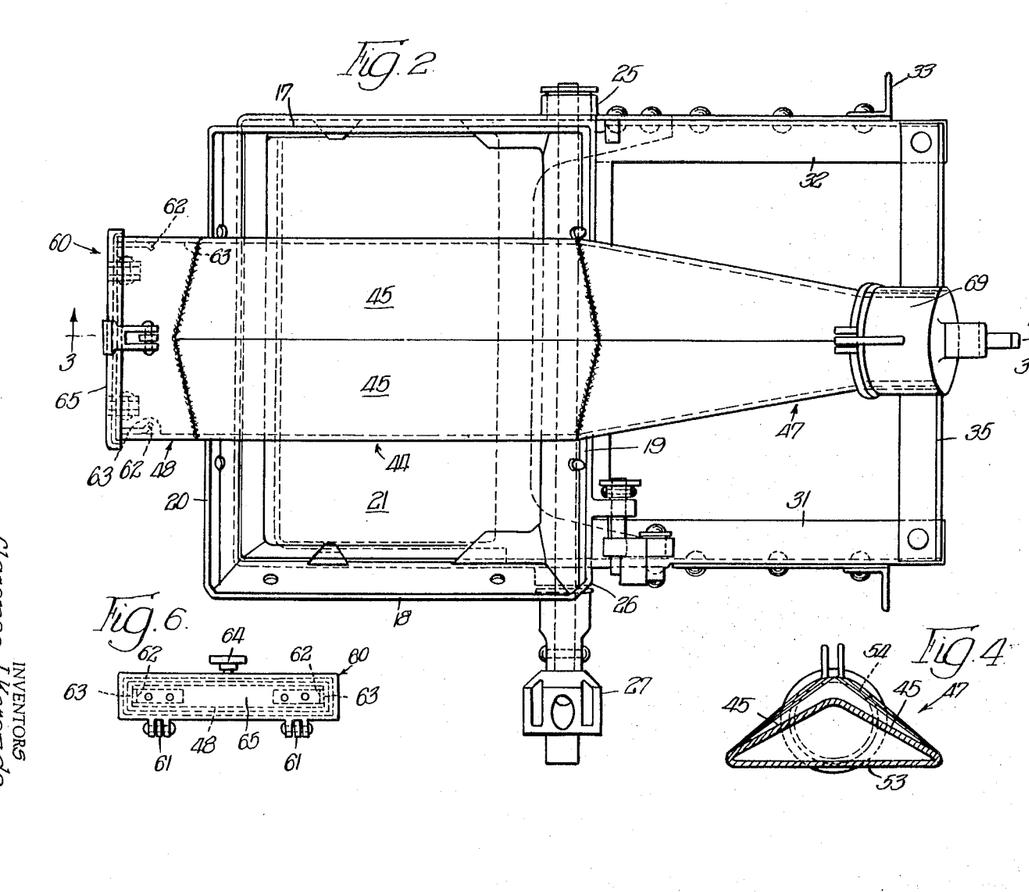
Figure 2 is a plan view of the structure shown in Figure 1 with the hopper floor sheets and certain other parts eliminated to better illustrate the construction.
Figure 4 is a fractional vertical sectional view taken through the conduit adjacent the frame and at a location corresponding substantially to a line 4—4 of Figure 3.
Figure 6 is a fractional vertical end view of a portion of Figure 1 showing the air admitting damper gate in closed position as viewed from left to right of said Figure 1.

For the purpose of closing the discharge opening and controlling the discharge of lading there is provided a horizontally sliding gate 21 which, when in closed position, provides a flat floor at the lower portion of the hopper. On the underside of the gate 21 rack teeth 22 are provided which are arranged to be engaged by pinions 23 which, in turn, are carried by and rotatable with a shaft 24. The shaft 24, which extends transversely of the path of movement of the gate 21, as shown in Figure 2, is rotatably mounted in bearings 25 and 26 carried by the frame 16. An operating head 27 is provided at one end of the shaft 24 to receive a removable operating bar (not shown) for rotating the shaft 24 and thereby moving the gate 21.

Horizontally extending supports or runways 28, 29 and 30 for supporting the gate are formed integrally with the frame 16 and extensions 31 and 32 are provided for prolonging the supports or runways 29 and 30 beyond the frame 16. The outer ends of the extensions 31 and 32 are supported by a framework which includes vertical angles 33—33 which, in turn, connect with the hopper structure by gussets 34. The extensions 31 and 32 are interconnected by a transversely extending angle 35.

Below the level of the gate 21 the frame 16 is provided with a downwardly extending chute like enclosure defined by walls 36, 37, 38 and 39 and the lower margins of walls 36 and 37 include outwardly extending horizontal flanges 40 and 41 and at the lower margins of walls 38 and 39 there are provided grooves 42 and 43 to receive a removable auxiliary chute (not shown) within the grooves and in abutting relation with flanges 40 and 41, if desired.

In certain instances it is desirable to provide for unloading the hopper and the car with which it is associated by means of suction instead of by gravity consequent upon the opening movement of the gate 21. To this end an unloading conduit system extending within the hopper and above the gate 21 is provided.

The conduit system referred to is preferably in the form of a centrally disposed hood shaped member or partition 44 which constitutes an inverted generally U-shaped hood providing a chamber to be evacuated that extends through the hopper formed by the walls 14—15 lengthwise in the direction of movement of the gate 21. The partition 44, which divides the lower portion of the main hopper into two hopper sections, preferably includes an upper roof like portion formed of oppositely sloping walls 45—45 leading to substantially vertically extending wall sections 46—46. The conduit system is provided with extensions 47 and 48 which are located at the respective ends of the frame 16 and form continuations of the hood shaped member or partition 44. The extension 47 constitutes the exit end of the conduit system while extension 48 is for the purpose of admitting atmospheric air into the system.

Openings 50 are provided between the lower marginal edges 51 of the walls 46 of the hood 44 in order to provide for the passage of lading from the hopper sections at each side whereby air entering conduit 48 will operate to entrain material from the hopper into the conduit system and carry it toward the exit end of the system as will be described.

The width of the hood shaped partition 44 is preferably of sufficient extent to span approximately one half of the discharge area normally served by the sliding gate 21 and thereby allows for the entraining air to effect a sweeping action on the entire floor area at each side of the partition 44. The conduit extension 48, which constitutes the air entry end of the system, is formed of elongated shape, as shown in Figures 2 and 6, and presents a lower flat wall 52 which is located in close proximity to the flat floor of the hopper bottom formed by the gate 21 and the flow of entering air is thus directed to effect sweeping of the lading along the bottom floor of the hopper or surface of the gate 21. Similarly, the exit end of the conduit system provided by the extension 47, as it joins with the hopper frame 16, is of elongated cross section with a lower flat wall 53, Figure 4, in close proximity to the flat floor of the hopper provided by the upper surface of the gate 21. The extension 47 of the conduit system is preferably of triangular shape at the junction with the frame 16 and gradually changes in cross section to merge into a circularly shaped nozzle section adjacent its extreme outer end as indicated at 54. The extension 47, as will be noted in Figure 3, is prolonged to extend slightly beyond the rail supporting framework of the outlet structure and is supported by brackets as indicated at 55.

Figure 8:
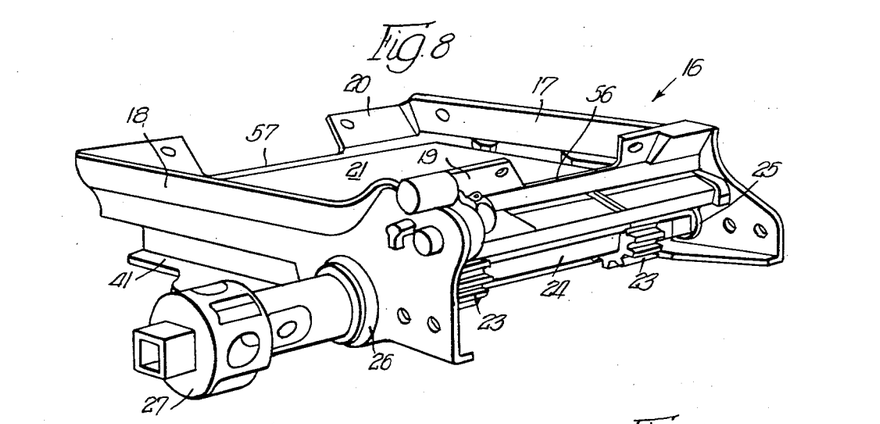
Figure 8 is a perspective view of the frame with the conduit system removed.

The extensions 47 and 48 rest in depressed seats 56 and 57 formed in the walls 19 and 20 (Figure 8) of the frame 16 and are preferably welded thereto, as at 58 and 59, to function as an integral part of the frame 16. The arrangement of the conduit permits assembly of the partition member 44 with the extensions 47 and 48 into a self containing unit and thereafter positioning the same in the seats 56 and 57 and welding the frame 16 and conduit together as described.

Figures 1, 7:
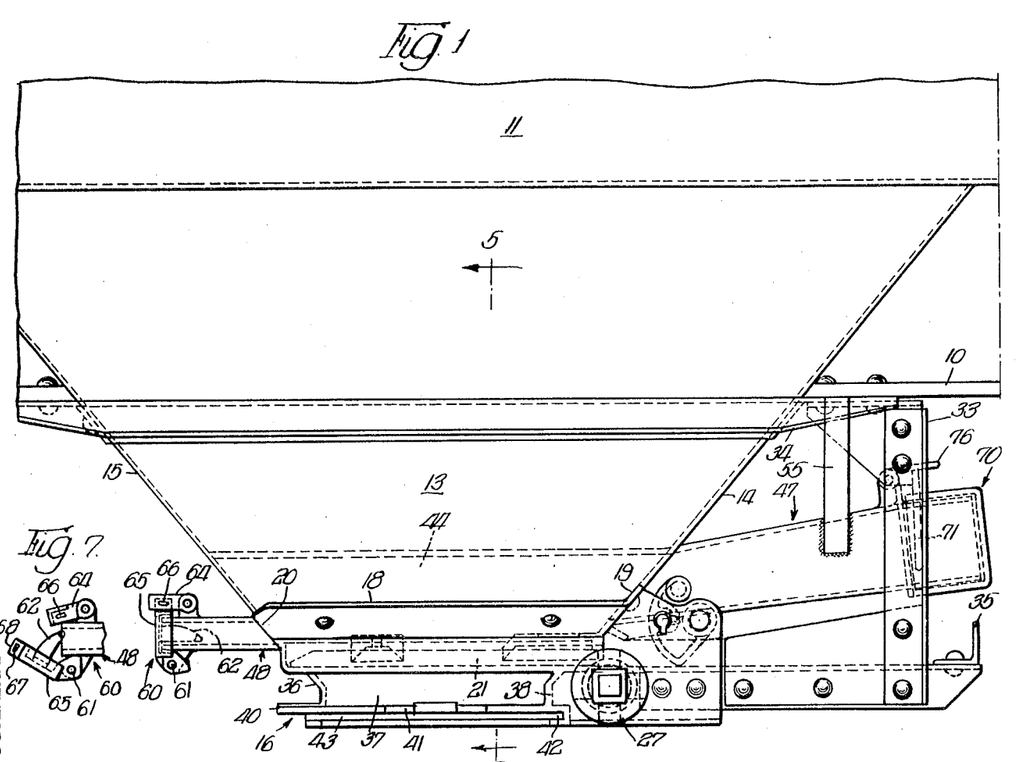
Figure 1 is a side elevational view of a portion of a hopper car showing as much of the car as is necessary to illustrate the application of the improvement.
Figure 7 is a fractional side view of the hopper showing the air admitting damper gate in partly open position.
Figure 3:
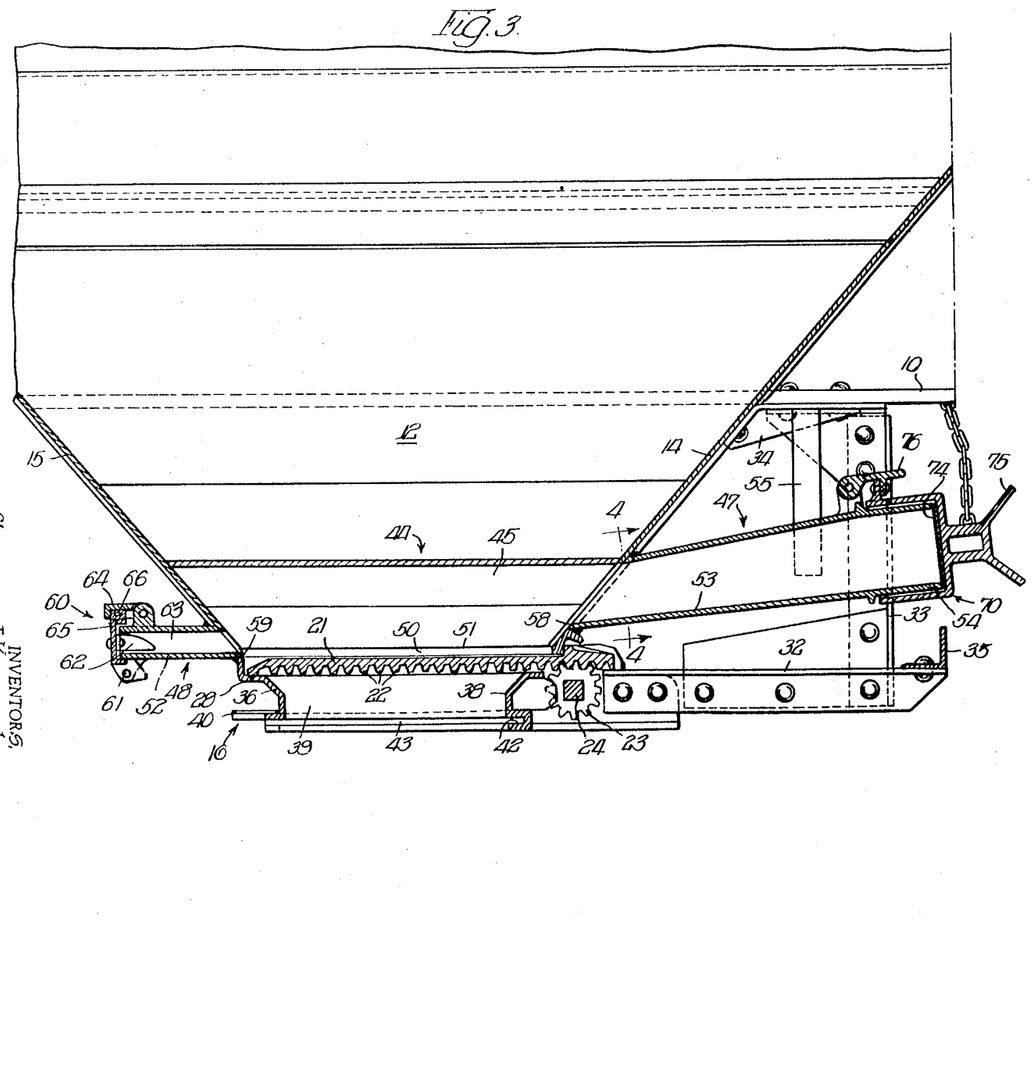
Figure 3 is a longitudinal vertical sectional view taken on a line 3—3 of Figure 2.
Figure 5:
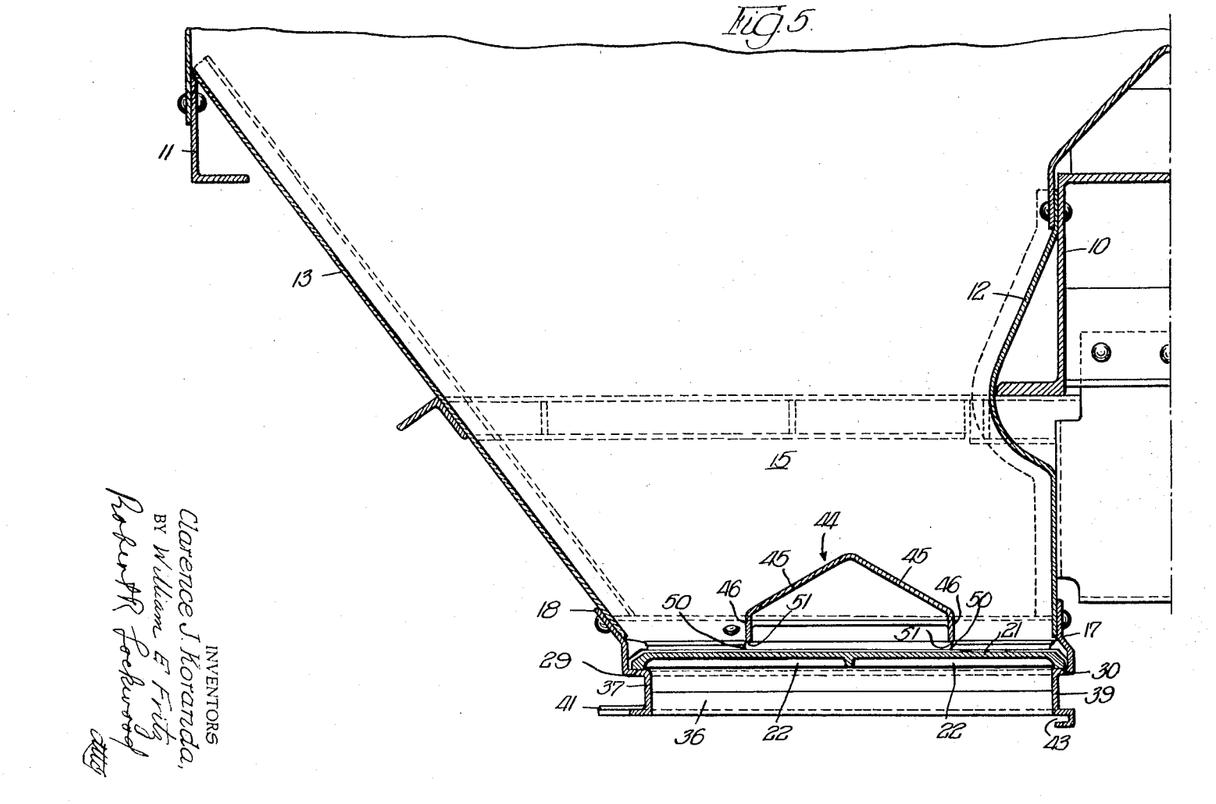
Figure 5 is a vertical transverse sectional view taken through the hopper and on a line 5—5 of Figure 1.

A graduating closure for the inlet end or extension 48 of the system is provided in the form of a damper gate 60, Figures 3 and 6, hinged at its lower edge as at 61 to swing downwardly toward open position. The damper gate 60 is arranged to be maintained in any adjusted position between its extreme open and closed positions by means of resilient lugs or fingers 62 which frictionally engage the inner sides 63 of the conduit extension 48. The damper gate 60 is maintained in closed position by a pivoted shouldered catch 64 which is adapted to embrace its outer face 65. An opening 66 for receiving a sealing ribbon (not shown) is provided in the catch 64 and the opening 66 is adapted to register with a similarly formed opening 67 formed in a lug 68 on the damper gate 60, Figure 7.

Figure 9:
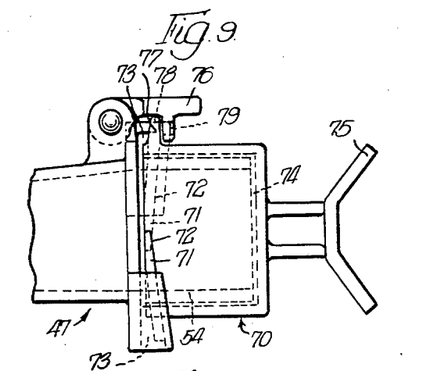
Figure 9 is a detached side elevational view of the exit end of the conduit showing, at an enlarged scale, the cap in closed and locked position.
Figure 10:
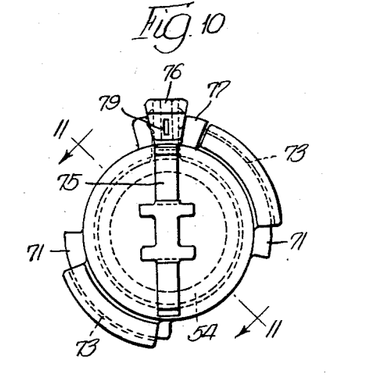
Figure 10 is an end view of the exit end of the conduit shown in Figure 9 as seen from right to left.
Figure 11:
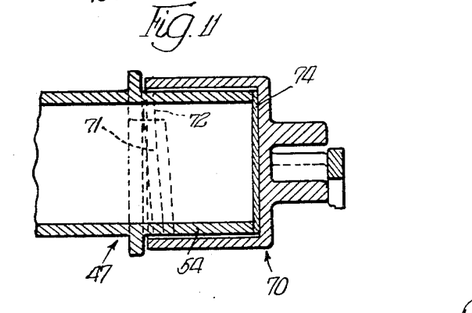
Figure 11 is a sectional view taken on a line 11—11 of Figure 10.

The exit end of the conduit or extension 47 includes the circular end 54, Figures 9, 10 and 11, which is adapted for connection with a source of reduced pressure. The end 54 is arranged to receive a removable sealing cap 70. The cap 70 is arranged on its outer side with laterally extending flange sections 71—71 disposed in opposite facing relation and each occupying less than one half of the circumference of the outer circular face of the cap 70. The flange sections 71 have one face 72 inclined helically to provide a camming action for advancing the cap 70 axially on turning movement thereof upon cooperation with similarly helically advancing faces on the circular end 54 as will be described. Cooperating with the flange sections 71 are grooves 73 on the outer face of the extension 47 which face radially inwardly and are located to provide sufficient space to admit the flange sections 71 therebetween. The grooves 73 are helically inclined to correspond to the inclination of the sections 71 in order to provide a screw threading action between the respective members upon relative rotation between the cap 70 and circular end 54. A gasket 74 is positioned between the end of the extension 47 and the inner surface of the cap 70 to exclude moisture. The cap 70 on the outer end is provided with a turning handle 75 which, when in operative position, is locked against reverse opening movement by means of a pivoted pawl 76 that is adapted to be swung in the path of movement of a lug 77 formed on the cap 70. Openings 78 and 79 are provided on the cap 70 and pawl 76, respectively, for receiving a sealing ribbon (not shown). The cap 70 and its application to the extension 47 are claimed in application Serial No. 709,652, filed January 17, 1958.

The cross sectional shape of the hood shaped member or partition 44 in relation to the side walls 12—15 of the hopper is such that material or lading flowing downwardly along the steeply inclined side walls will be directed toward the sides of the partition 44 to lie in heaps adjacent the vertical wall sections 46 where it will flow beneath the edges 51 into the hood 44 to be picked up by the air stream and ejected through extension or nozzle 47.

The operation of the structure is simple. Upon arrival at the unloading station the load may be released by the simple expedient of moving the sliding gate 21 to open position, or at the option of the consignee, the extension or ejecting nozzle 47 may be connected with a source of reduced pressure and the damper gate 60 opened whereupon atmospheric air enters the conduit system in the desired volume and the lading is thereby entrained within the partition or hood 44 and directed out of the extension of ejecting nozzle 47.

It is understood that certain modifications can be made in the structure. For instance, the openings 50 along the edges 51 of the wall sections 46 can be formed of various shapes and in a series of openings instead of being continuous as shown.

Another embodiment of the invention is shown in Figures 12-16 of the drawings to which reference now will be had. Where the same elements are shown in these drawings that appear in the preceding figures the same reference characters will be employed.

Figure 12:
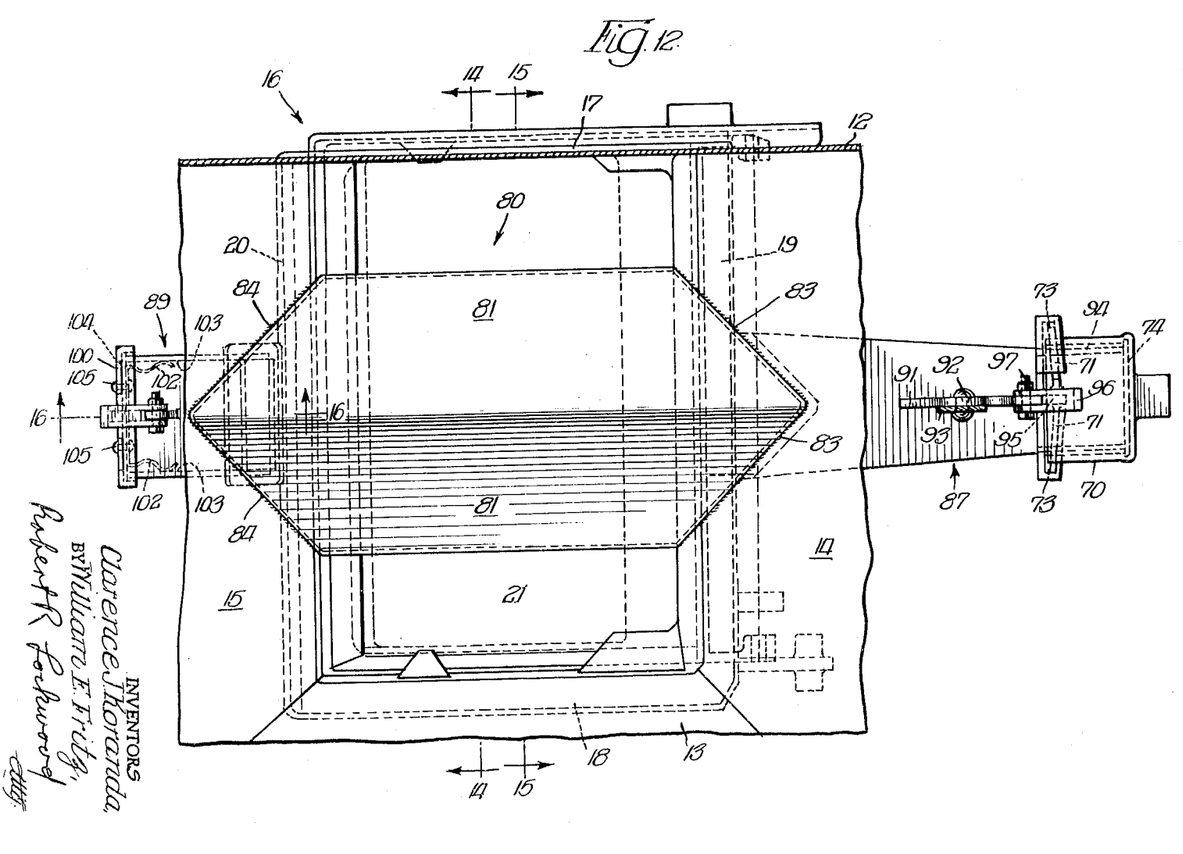
Figure 12 is a top plan view of a modified form of the invention, portions of the side and end walls being shown.
Figure 13:
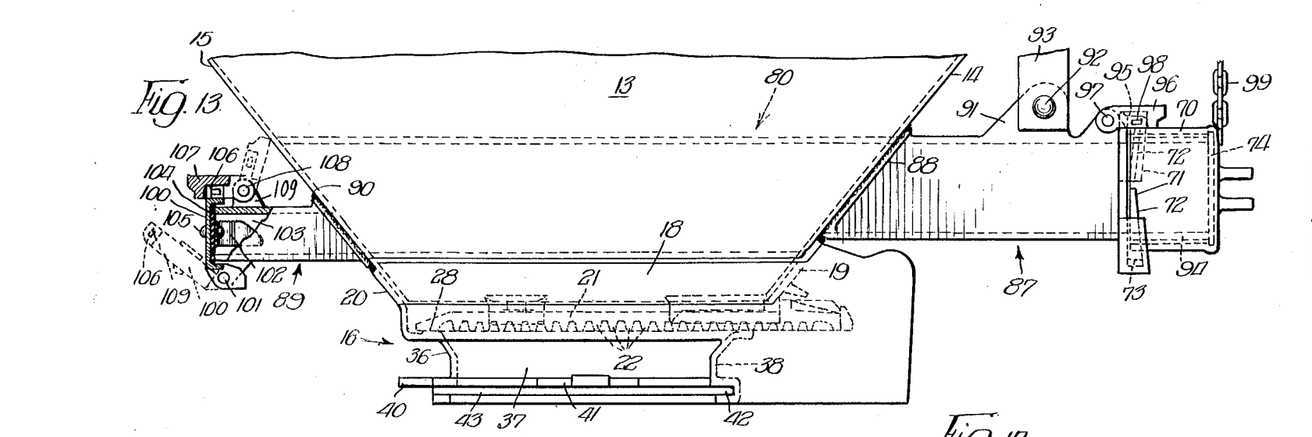
Figure 13 is a view, in side elevation, of the construction shown in Figure 12, the operating head and parts attached thereto for moving the gate being omitted.

Within the hopper formed by the side walls 12—13 and end walls 14—15 there is provided a hood shaped member or partition 80 which corresponds to the hood shaped member 44 previously described and, like it, constitutes an inverted generally U-shaped hood that forms a chamber to be evacuated. Here the hood shaped member 80 is formed by oppositely sloping walls 81 which angle downwardly and terminate in lower edges 82 that are spaced slightly above the upper surface of the gate 21 when it is in the closed position. It will be understood that the lading on opposite sides of the hood shaped member or partition 80 is drawn into it through the space 82' between the lower edges 82 and the upper surface of the gate 21 and then is exhausted in the manner described hereinbefore. It will be observed that the hood shaped member or partition 80 overlies slightly more than one-half of the exposed upper surface of the gate 21. The ends of the hood shaped member or partition 80 are generally angularly shaped, as shown in Figure 12, for juxtaposition to inclined end walls 14 and 15 to which they are welded as indicated at 83 and 84 respectively.

Figure 14:
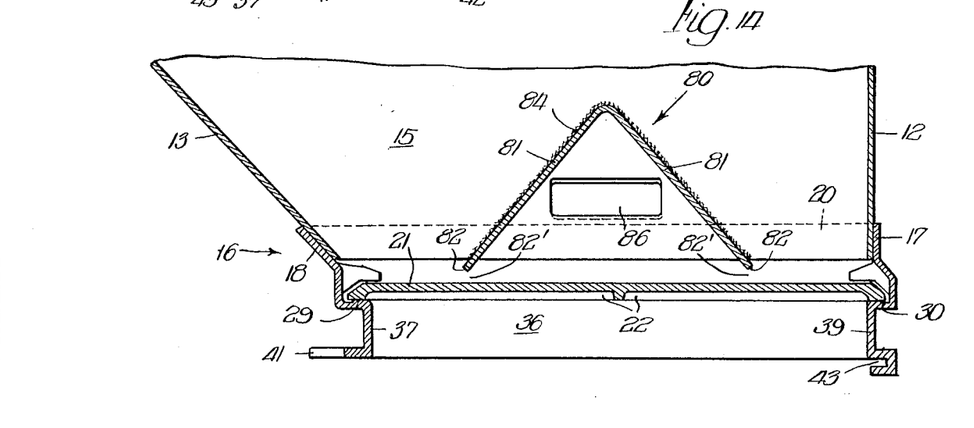
Figure 14 is a vertical sectional view taken generally along the line 14—14 of Figure 12.
Figure 15:
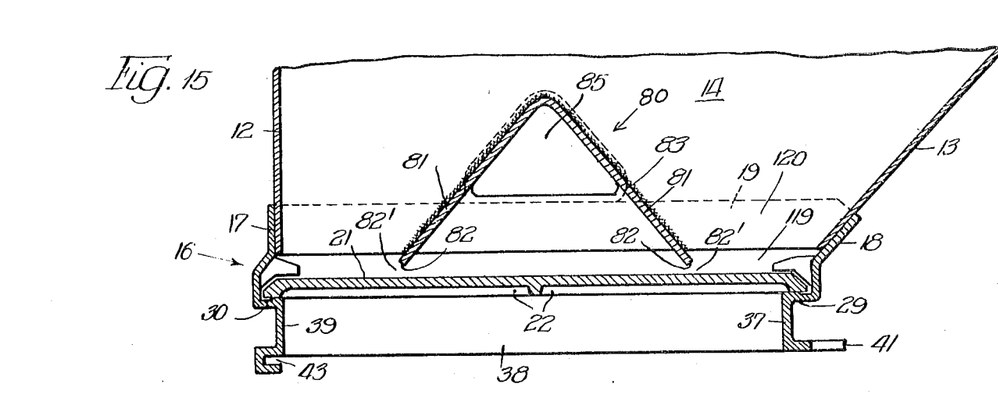
Figure 15 is a vertical sectional view taken generally along the line 15—15 of Figure 12.

In order to communicate with the space within the hood shaped member or partition 80, the end wall 14 is provided with a triangular opening 85, Figure 15, which is located above the end wall 19 of the outlet frame 16. A similar construction is provided in the end wall 15 as shown in Figure 14. Here a rectangular opening 86 is provided in the end wall 15 at a location above the upper edge of the end wall 20 of the frame 16. By locating the openings 85 and 86 in the end walls 14 and 15 above the end walls 19 and 20 of the outlet frame 16 it is unnecessary to provide recesses in these walls or to provide a special construction for receiving the pneumatic unloading mechanism.

Communicating with the triangular opening 85 in the end wall 14 is a conduit extension 87 which has a triangular shape to conform to the triangular shape of the opening 85. It is welded, as indicated at 88, to the outer surface of the end wall 14. The conduit extension 87 provides an exit or exhaust conduit through which the lading, that is drawn into the hood shaped member or partition 80, is conveyed away from the hopper of the car to suitable receiving means.

Communicating with the rectangular opening 86 is a conduit extension 89 that is welded, as indicated at 90, to the outer surface of the end wall 15. The conduit extension 89 constitutes an air intake which provides the conveying medium for removing the lading from underneath the hood shaped member or partition 80.

Now it will be apparent that a hopper car which is provided with conventional lading discharge means, such as the frame 16, gate 21 and parts associated therewith can be modified without making any change whatsoever in the frame 16. All that is required is to provide the triangular opening 85 in the end wall 14 and the rectangular opening 86 in the end wall 15 and to secure the conduit extensions 87 and 89 to the outer sides of these walls. Within the hopper formed by the side and end walls 12—15, the hood shaped member or partition 80 is properly located and welded to the inner sides of the end walls 14—15. When so modified, the hopper outlet car can be employed either for conpentional gravity unloading or for pneumatic unloading as may be desired, provided of course that pneumatic conveying means and a source of vacuum are available.

The conduit extension 87 is provided with an upstanding ear 91 through which a pin 92 extends for securing it to a bracket 93 that supports the conduit extension 87. The conduit extension 87 terminates in a cylindrical portion 94 which corresponds to the similarly shaped end 54 of the extension 47 previously described. In transit the cylindrical portion 94 is closed by the cap 70, previously described, which is provided with flange sections 71 interfitting with the grooves 73.

In order to lock the cap 70 in position a lug 95 extends upwardly therefrom and is arranged to be straddled by a latch 96 that is pivoted at 97 on the ear 91. An aperture 98 extends through the latch 96 and lug 95 for receiving a sealing band. A chain 99 can be attached to the cap 70 to prevent its being lost when it has been removed from the cylindrical portion 94 to permit pneumatic unloading of the hopper.

Figure 16:
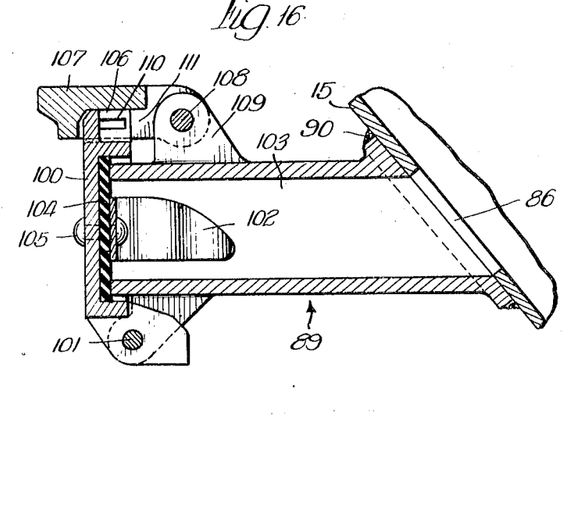
Figure 16 is a vertical sectional view taken generally along the line 16—16 of Figure 12.

As shown more clearly in Figure 16 the conduit extension 89 is arranged to be closed by a damper gate 100 which is hinged at 101 on a depending lug from the conduit extension 89. As described hereinbefore for the damper gate 60, resilient lugs or fingers 102 are provided for engaging the inner sides 103 of the conduit extension 89 to hold the damper gate 100 in any position to which it may be moved so that the amount of air permitted to flow into the conduit extension 87 can be adjusted in accordance with operating conditions. On the inner side of the damper gate 100 a gasket 104 is provided to provide a sealed connection with the end of the conduit extension 89. Rivets 105 extending through the face of the damper gate 100, gasket 104 and base portion of the lugs or fingers 102 serve to hold these parts in assembled relation. Extending upwardly from the damper gate 100 is a lug 106 with which a latch 107 cooperates to hold the damper gate 100 in the closed position. The latch 107 is pivoted at 108 on an ear 109 that extends upwardly from the conduit extension 89. The lug 106 is apertured at 110 and registering apertures are provided in walls 111 which depend from the latch 107 and are located on opposite sides of the lug 106 to receive a sealing band.

Figure 17:
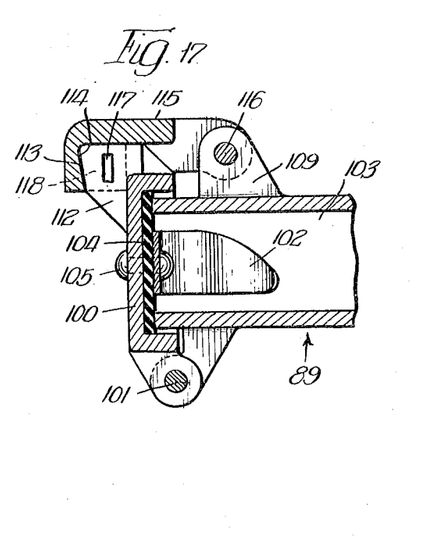
Figure 17 is a view, similar to Figure 16, showing a modified construction.
Figure 18:
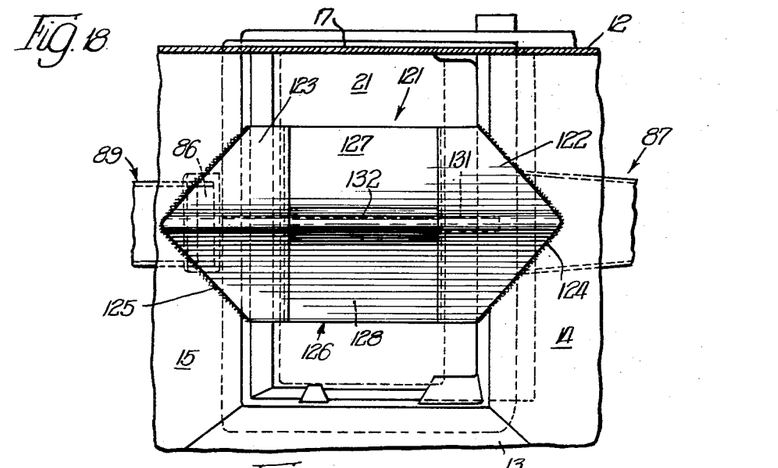
Figure 18 is a top plan view of a hopper outlet construction in accordance with this invention which is provided with a hood shaped member having a movable portion which increases the effective size of the discharge area when the gate is in the open position.

Figure 17 shows a modification of the latch means for securing the damper gate 100 in the closed and sealed position. Here it will be observed that a lug 112 extends outwardly and upwardly from the damper gate 100. The lug 112 is provided with an inclined latch surface 113 that is juxtaposed to a reentrant latch surface 114 of a latch 115 which is pivoted at 116 on the lug 109. The gasket 104 is relatively thick and can be compressed to an extent sufficient to permit the damper gate 100 to be moved slightly past the position shown in Figure 17 so that the lower edge of the reentrant latch surface 114 can be located slightly to the left of the upper edge of the latch surface 113 on the lug 112. When the latch 115 is moved to the position shown in Figure 17, the gasket 104 expands and resiliently holds the inclined latch surface 113 in firm engagement with the reentrant latch surface 114 on the latch 115.

An aperture 117 is located in the lug 112 in registry with similar apertures in walls 118 depending from the latch 115 and straddling the lug 112. The aperture 117 and registering apertures in the walls 118 are provided for receiving a sealing band. It will be understood that the locking mechanism shown in Figure 17 can be employed in lieu of the locking mechanism shown in Figure 16 when desired.

In order to pneumatically unload lading from the hopper formed by the walls 12—15 and shown in Figures 12–15, the cap 70 is removed and the pneumatic conveying equipment is connected to the discharge end of the conduit extension 87. The damper gate 100 is opened to the desired extent. On the application of suction to the conduit extension 87, air is drawn in through the conduit extension 89 or air intake and sweeps downwardly over the upper surface of the gate 21 to entrain the lading which flows into the space underneath the hood shaped member 80 through the spaces 82' along opposite sides between the lower edges 82 and the upper surface of the gate 21. The lading is carried upwardly over the inner surface 119 of the end wall 19 of the frame 16 that is exposed thereto and continues on over the adjacent portion of the inner surface 120 of the end wall 14 until it reaches the triangular opening 85. Of course a substantial portion of the lading is entrained in the air and is air borne throughout.

Referring now to the embodiment of the invention shown in Figures 18–23, inclusive, it will be observed that the reference character 121 designates, generally, a hood shaped member which corresponds to the hood shaped members 44 and 80 previously described and, like them, constitutes an inverted generally U-shaped housing that forms a chamber to be evacuated. The hood shaped member 121 is incorporated in a hopper outlet formed by walls 11, 12, 13 and 14 which provide a discharge area that is surrounded by the frame 16 all as previously described. Conduit extensions 87 and 89 are located on the end walls 14 and 15, as previously described, for pneumatically unloading the hopper when the gate 21 is in the closed position.

When the gate 21 is in the open position for the purpose of permitting the downward discharge of lading by gravity, it is desirable to have maximum discharge area. It is for this purpose that the hood shaped member 121 is provided. It includes end portions 122 and 123 that are welded, as indicated at 124 and 125, to the respective end walls 14 and 15. Intermediate these end portions 122 and 123 is a movable portion that is indicated, generally, at 126.

Figures 19, 20:
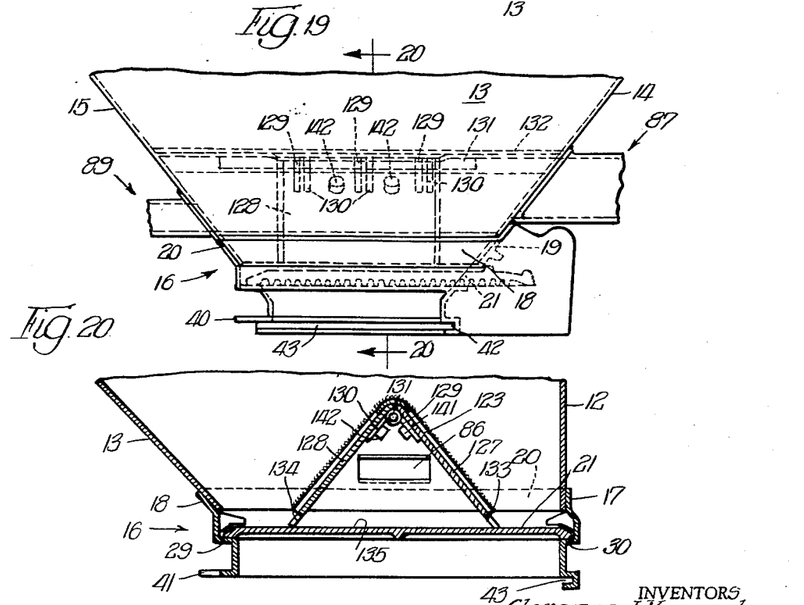
Figure 19 is a view, in side elevation, of the construction shown in Figure 18.
Fig. 20 is a vertical sectional view taken generally along the line 20—20 of Figure 19.
Figure 21:
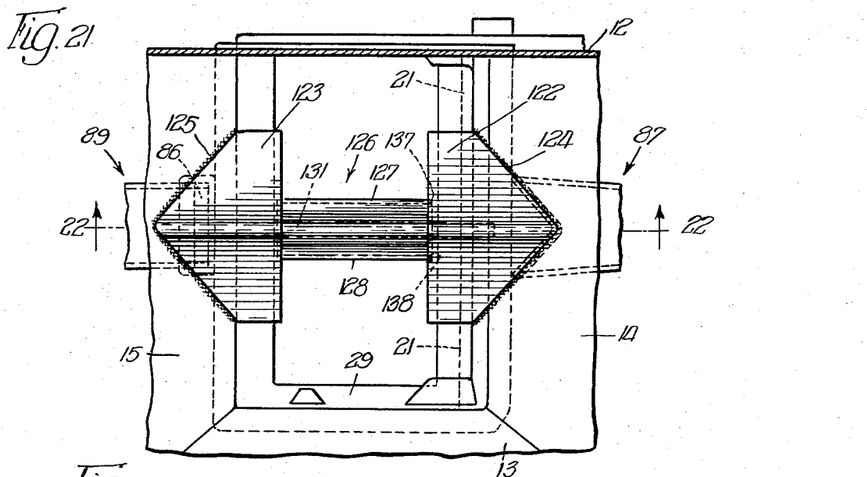
Figure 21 is a top plan view of the construction shown in Figure 18 with the gate in the open position and the movable portion in the contracted position providing increased discharge area.

The movable portion 126, in accordance with the embodiment here shown, includes a pair of plate members 127 and 128 which, in the expanded position, constitute extensions of the end portions 122 and 123 and underlie them as shown more clearly in Figure 20. The plate members 127 and 128 are provided with hinges 129 and 130 along their upper edges which are pivoted on a hinge rod 131, Figure 22, the ends of which are secured to the underside of an apex section 132 which joins the end portions 122 and 123 and overlies the joint between the upper edges of the plate members 127 and 128 and prevents the downward flow of lading therebetween.

In order to hold the lower edges of the plate members 127 and 128 in spaced relation to the gate 121 in the closed position for the purpose of permitting pneumatic unloading, as previously described, spacers or legs 133 and 134 are provided as integral parts of the plate members 127 and 128 along the lower edges and at their ends. The lower ends of the spacers or legs 133 and 134, as shown in Figure 20, are arranged to engage the upper surface 135 of the gate 21 when it is closed.

With a view to moving the plate members 127 and 128 to the expanded positions shown in Figures 18, 19 and 20 as the gate 21 is moved toward the closed position, the edges of the plate members 127 and 128 are beveled as indicated at 137 and 138 on the sides thereof adjacent the beveled leading edge 139 of the gate 21. It will be understood that the beveled edge 139 is the leading edge when the gate 21 is moved toward the closed position. The beveled edge 139 engages the beveled edges 137 and 138 of the plate member 127 and 128 and acts to spread them apart to the full extent shown in Figure 20. The beveled edges 137 and 138 continue onto the spacers or legs 133 and 134 adjacent the leading edge 139.

Figures 22, 23:
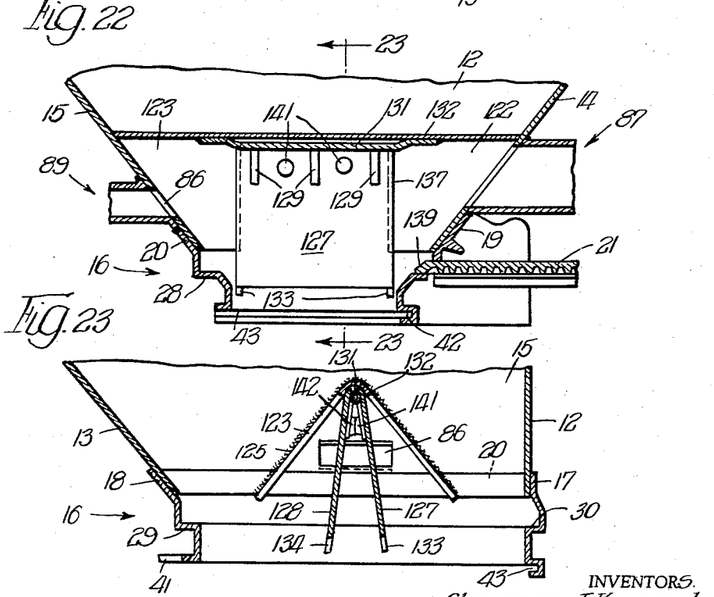
Figure 22 is a vertical sectional view taken generally along the line 22—22 of Figure 21.
Figure 23 is a vertical sectional view taken generally along the line 23—23 of Figure 22.
Figure 24:
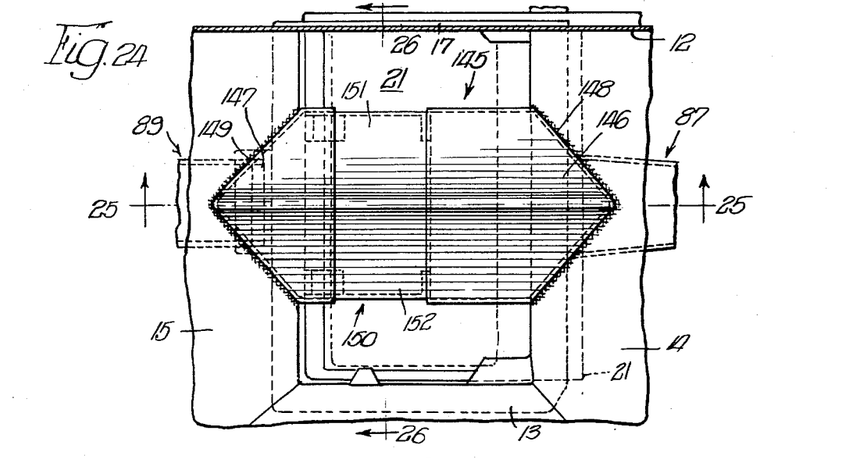
Figure 24 is a top plan view of another modification of the hopper outlet construction, similar to that shown in Figure 18, but provided with a rigid inverted V-shape movable portion for increasing the size of the discharge area when the gate is in the open position.

With a view to biasing the plate members 127 and 128 partially to the extended or expanded position resilient members 141 and 142 are secured thereto, as indicated in Figure 20, on the underside. The resilient members 141 and 142 may be formed of rubber and are relatively highly compressible as indicated in Figure 23 which shows the relationship between the plate members 127 and 128 while lading is flowing therepast downwardly through the discharge opening provided by the frame 16. On cessation of the flow of lading past the plate members 127 and 128, the resilient members 141 and 142 expand and bias them from the contracted positions toward the fully expanded position shown in Figure 20. As described above, the final movement of the plate members 127 and 128 to the fully expanded positions is accomplished by engagement of the beveled leading edge 139 of the gate 21 with the beveled edges 137 and 138 of the plate members 127 and 128 when the gate 21 is moved toward the closed position.

Figures 24 to 29 inclusive show another embodiment of the invention in which another arrangement to provide a movable portion for the hood shaped member is shown. Here the hood shaped member is indicated, generally, at 145 and it includes end portions 146 and 147 which are secured by welding as indicated at 148 and 149 to the end walls 14 and 15 respectively. The hood shaped member 145, like the members 44, 80 and 121, constitutes an inverted generally U-shaped housing which forms a chamber to be evacuated between the end walls 14 and 15. It will be understood that the hopper construction shown in these figures, except for the construction of the hood shaped member 145 and certain modifications of the gate 21, is the same as described previously for Figures 1 to 17 inclusive.

Figure 25:
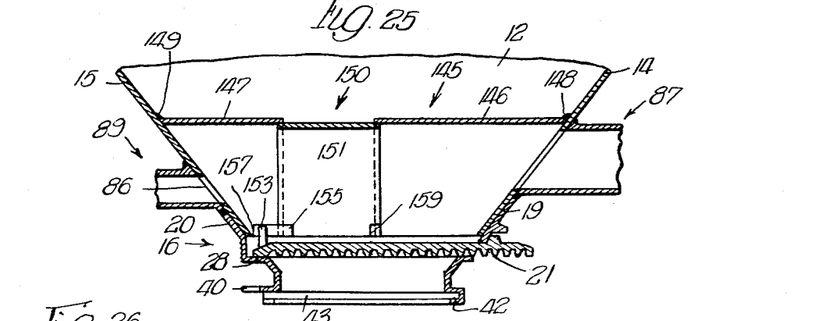
Figure 25 is a vertical sectional view taken generally along the line 25—25 of Figure 24.
Figure 26:
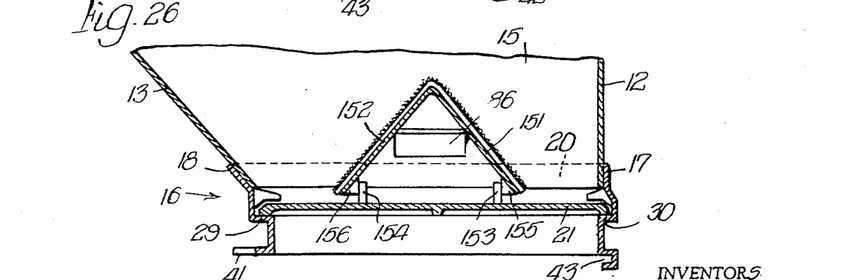
Figure 26 is a vertical sectional view taken generally along the line 26—26 of Figure 24.

Between the end portions 146 and 147 of the hood shaped member 145 there is provided a movable portion that is indicated, generally, at 150. It is of inverted V-shape and is rigid and is formed by sides 151 and 152 which are joined along the apex. As shown in Figure 25 the ends of the movable portion 150 are arranged to underlie the respective ends of the end portions 146 and 147 which are similarly shaped.

Figure 28:
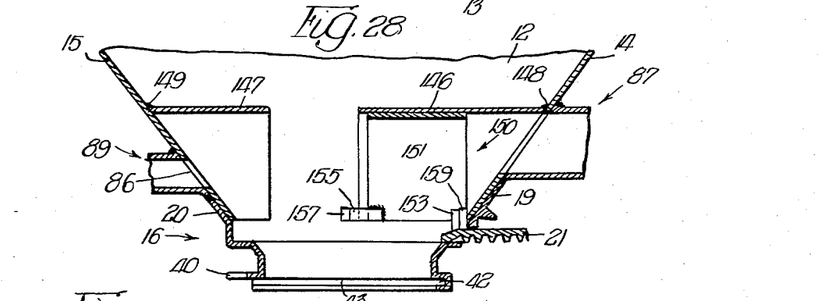
Figure 28 is a vertical sectional view taken generally along the line 28—28 of Figure 27 and showing the gate in the fully opened position.
Figure 29:
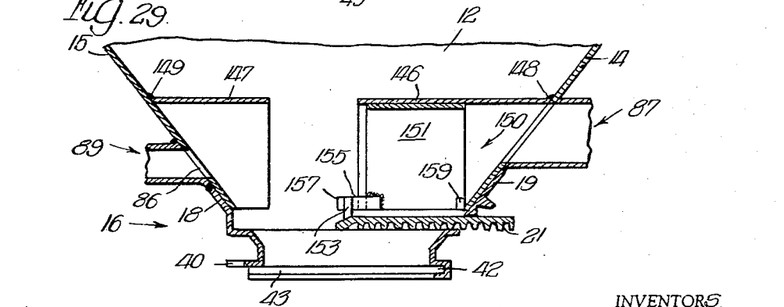
Figure 29 is a vertical sectional view, similar to Figure 28, showing the gate in the partially closed position where it engages the movable portion of the hood shaped member to restore it to the closed position on continued movement of gate in the closing direction.

In order to increase the size of the discharge area when the gate 21 is moved to the open position, provision is made in accordance with this embodiment of the invention to slide the movable portion 150 underneath the end portion 146 as shown in Figures 28 and 29. This is accomplished by movement of the gate 21 which is provided with upstanding detents 153 and 154. Cooperating with the detents 153 and 154 when the gate 21 is moved toward the closed position, are detent receiving members 155 and 156 which are secured by welding or otherwise to the forward lowermost portions of the sides 151 and 152. The detent receiving members 155 and 156 carry inwardly extending arms 157 and 158, respectively, which are located in the path of movement of the detents 153 and 154.

Figure 27:
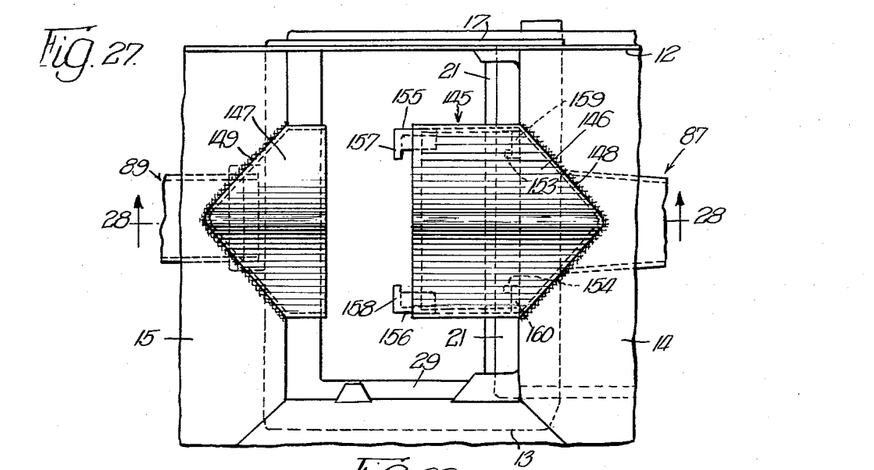
Figure 27 is a top plan view, similar to Figure 24, but showing the movable portion of the hood shaped member in retracted position when the gate is open.

For opening the movable portion 150 on movement of the gate 21 to the open position detent receiving members 159 and 160 are provided on the lowermost opposite edges of the sides 151 and 152. It will be observed that the detent receiving members 159 and 160 are spaced from the detent receiving members 155 and 156, respectively, in order to permit partial opening of the gate 21 before any movement of the movable portion 150 is effected. This will be clear from a consideration of Figure 25 which shows the movable portion 150 in the closed position and the gate 21 in the closed position. Before any movement of the movable portion 150 takes place, the gate 21 is moved in the opening direction until the detents 153 and 154 engage the detent receiving members 159 and 160. Then continued movement of the gate 21 in the opening direction effects simultaneous movement of the movable portion 150 in the same direction until it is completely telescoped underneath the end portion 146 as shown in Figures 27 and 28 of the drawings. Here the gate 21 is shown in the fully opened position.

When the gate 21 is moved to the closed position from the open position shown in Figure 28, it moves, as shown in Figure 29, to the partially closed position before the detents 153 and 154 engage the arms 157 and 158 on the detent receiving members 155 and 156. Thereafter continued movement of the gate 21 in the closing direction causes simultaneous movement therewith of the movable portion 150 until it is returned to the fully closed position shown in Figure 25.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a load containing hopper including movable closure means in closed position forming the bottom of the hopper, a conduit system for pneumatically unloading the hopper including an inverted generally U-shaped hood extending through the hopper above said closure means and having part of the side walls spaced away from the sides of the hopper and providing hopper sections having gravity discharge openings on opposite sides of said hood, the lower edges of said hood being spaced slightly away from said closure means to provide air and material passages for the flow of lading from said hopper sections into the confines of said hood, said hood having enclosed extensions at each end of the hopper lying outwardly thereof, one of said extensions constituting an air inlet for entraining material and the other end providing an exit opening for connection with a suction source and ejecting material therethrough from said hopper, and means for moving said closure means away from the bottom of the hopper to permit discharge of lading by gravity past said hood.

2. In a four sided hopper outlet structure for a load containing hopper having a discharge opening and movable closure means for closing the opening, an inverted generally U-shaped hood above said closure means dividing the hopper into two sections to present hopper sections on opposite sides of said hood, said closure means and said hood defining a passageway extending through said hopper, said hood having openings at each side above the upper surface of said closure means and openings at each end to allow the passage of a stream of air through one of the end openings to entrain material through said hood and eject said entrained material through the other end opening, and means for moving said closure means to open said discharge opening and permit discharge of the lading by gravity from the bottoms of said two hopper sections.

3. In a hopper bottom car of the type having an opening and a sliding gate for closing the opening and adapted to be selectively unloaded by gravity through a discharge opening or pneumatically by a source of reduced pressure, the herein described improvement for pneumatically unloading the hopper which comprises an inverted generally U-shaped hood extending through the hopper to divide the same into two compartments, said hood having adjacent its lower outer marginal edges openings spaced from the face of said gate to provide for the passage of lading therebetween, and openings at the ends of said hood to allow the passage of a stream of air through one of the openings to entrain lading through said hood and eject the same through the other opening, said other opening being formed by a conduit having a flat bottom wall at a greater elevation than the upper surface of said gate to permit sweeping action for clearing the lading therefrom and directing it outwardly thereof.

4. In a hopper bottom car of the type having an opening and a sliding gate for closing the opening and adapted to be selectively unloaded by gravity through a discharge opening or pneumatically by a source of reduced pressure, the herein described improvement for pneumatically unloading the hopper which comprises an inverted generally U-shaped hood extending through the hopper to divide the same into two compartments, said hood having adjacent its lower outer marginal edges openings spaced from the face of said gate to provide for the passage of lading therebetween, and openings at the ends of said hood to allow the passage of a stream of air through one of the openings to entrain lading through said hood and eject the same through the other opening, said other opening from said hood being formed by a conduit having a flat bottom wall at a slightly higher elevation than the upper surface of said gate with an inclined hopper wall section bridging the space therebetween to permit sweeping action for clearing the lading therefrom, said conduit terminating in a cylindrical nozzle discharge section.

5. In combination, a load containing hopper formed by four depending walls defining a discharge opening having at least one pair of opposite side walls inclined toward said opening, a frame surrounding said discharge opening having upstanding walls overlying and secured to said hopper walls, closure means movably mounted on said frame for closing said opening, openings in said opposite walls of said hopper above the respective overlying walls of said frame an inverted generally U-shaped hood secured at its ends to said opposite walls of said hopper above said closure means and dividing said hopper into two sections to present hopper sections on opposite sides of said hood, said hood defining a passageway between said openings with its lower edges spaced from the upper surface of said closure means, air intake means connected to one of said openings, lading and air exhaust means connected to the other of said openings whereby on application of suction to said exhaust with said closure means in closed position air is drawn through said intake and lading on opposite sides of said hood is drawn through the space between said lower edges and the upper surface of said closure means and is entrained thereby and carried out of said exhaust, and means for moving said closure means to open said discharge opening and permit discharge of the lading by gravity from the bottoms of said two hopper sections.

6. In combination, a load containing hopper formed by four depending walls defining a discharge opening, a frame surrounding said discharge opening having upstanding walls overlying and secured to said hopper walls and a movable gate for closing said opening, operating means connected to said gate for moving it between open and closed positions, one pair of opposite walls of said hopper being provided with openings, and inverted generally U-shaped hood secured at its ends to said opposite walls and defining a passageway between said openings with its lower edges spaced from the upper surface of said gate, a portion of said hood intermediate said ends thereof being movable relative to said ends when said gate is open to increase the effective area of said discharge opening, air intake means connected to one of said openings, and lading and exhaust means connected to the other of said openings whereby on application of suction to said exhaust means when said gate is closed air is drawn through said intake means and lading on opposite sides of said hood is drawn through the spaces between said lower edges and the upper surface of said gate and is entrained thereby and carried out of said exhaust means.

7. In combination, a load containing hopper formed by four depending walls defining a discharge opening, a frame surrounding said discharge opening having upstanding walls overlying and secured to said hopper walls and a slidable gate for closing said opening, operating means connected to said gate for moving it between open and closed positions, one pair of opposite walls of said hopper being provided with openings, an inverted generally U-shaped hood secured at its ends to said opposite walls and defining a passageway between said openings with its lower edges spaced from the upper surface of said gate, a portion of said hood intermediate said ends thereof being movable relative to said ends when said gate is open to increase the effective area of said discharge opening, means on said portion of said hood cooperating with said gate for controlling the operation of the former in accordance with the movement of the latter, air intake means connected to one of said openings, and lading and exhaust means connected to the other of said openings whereby on application of suction to said exhaust means when said gate is closed air is drawn through said intake means and lading on opposite sides of said hood is drawn through the spaces between said lower edges and the upper surface of said gate and is entrained thereby and carried out of said exhaust means.

8. In combination, a load containing hopper formed by four depending walls defining a discharge opening, a frame surrounding said discharge opening having upstanding walls overlying and secured to said hopper walls and a slidable gate for closing said opening, operating means connected to said gate for moving it between open and closed positions, one pair of opposite walls of said hopper being provided with openings, an inverted generally U-shaped hood secured at its ends to said opposite walls and defining a passageway between said opening with its lower edges spaced from the upper surface of said gate, a portion of said hood intermediate said ends thereof being movable relative to said ends when said gate is open to increase the effective area of said discharge opening, said portion of said hood including a pair of side plate members hinged together along the apex of said hood, said side plate members being held in extended relation by said gate in closed position and biased downwardly by lading and gravity to contracted relation when said gate is in open position, air intake means connected to one of said openings, and lading and exhaust means connected to the other of said openings whereby on application of suction to said exhaust means when said gate is closed air is drawn through said intake means and lading on opposite sides of said hood is drawn through the spaces between said lower edges and the upper surface of said gate and is entrained thereby and carried out of said exhaust means.

9. In combination, a load containing hopper formed by four depending walls defining a discharge opening, a frame surrounding said discharge opening having upstanding walls overlying and secured to said hopper walls and a slidable gate for closing said opening, operating means connected to said gate for moving it between open and closed positions, one pair of opposite walls of said hopper being provided with openings, an inverted generally U-shaped hood secured at its ends to said opposite walls and defining a passageway between said openings with its lower edges spaced from the upper surface of said gate, a portion of said hood intermediate said ends thereof being movable relative to said ends when said gate is open to increase the effective area of said discharge opening, said portion of said hood including a pair of side plate members hinged together along the apex of said hood, said side plate members being held in extended relation by said gate in closed position and biased downwardly by lading and gravity to contracted relation when said gate is in open position, spacer means depending from said side plate members and engaging the upper surface of said gate in closed position to hold said edges in said spaced relation thereto, the edges of said side plate members and of said spacer means facing the leading edge of said gate when it is being moved toward closed position being beveled whereby said side plates are moved to extended position on closure of said gate, air intake means connected to one of said openings, and lading and exhaust means connected to the other of said openings whereby on application of suction to said exhaust means when said gate is closed air is drawn through said intake means and lading on opposite sides of said hood is drawn through the spaces between said lower edges and the upper surfaces of said gate and is entrained thereby and carried out of said exhaust means.

10. In combination, a load containing hopper formed by four depending walls defining a discharge opening, a frame surrounding said discharge opening having upstanding walls overlying and secured to said hopper walls and a slidable gate for closing said opening, operating means connected to said gate for moving it between open and closed positions, one pair of opposite walls of said hopper being provided with openings, an inverted generally U-shaped hood secured at its ends to said opposite walls and defining a passageway between said openings with its lower edges spaced from the upper surface of said gate, a portion of said hood intermediate said ends thereof being movable relative to said ends when said gate is open to increase the effective area of said discharge openings, said portion of said hood being an inverted V-shaped member having its ends underlying the adjacent ends of said hood and being slidable underneath the end thereof adjacent said gate in open position, air intake means connected to one of said openings, and lading and exhaust means connected to the other of said openings whereby on application of suction to said exhaust means when said gate is closed air is drawn through said intake means and lading on opposite sides of said hood is drawn through the spaces between said lower edges and the upper surface of said gate and is entrained thereby and carried out of said exhaust means.

11. In combination, a load containing hopper formed by four depending walls defining a discharge opening, a frame surrounding said discharge opening having upstanding walls overlying and secured to said hopper walls and a slidable gate for closing said opening, operating means connected to said gate for moving it between open and closed positions, one pair of opposite walls of said hopper being provided with openings, an inverted generally U-shaped hood secured at its ends to said opposite walls and defining a passageway between said openings with its lower edge spaced from the supper surface of said gate, a portion of said hood intermediate said ends thereof being movable relative to said ends when said gate is open to increase the effective area of said discharge opening, said portion of said hood being an inverted V-shaped member having its ends underlying the adjacent ends of said hood and being slidable underneath the end thereof adjacent said gate in open position, detent means on said gate cooperating with detent receiving means on said inverted V-shaped member for moving the same between open and closed positions on corresponding movement of said gate, air intake means connected to one of said openings, and lading and exhaust means connected to the other of said openings whereby on application of suction to said exhaust means when said gate is closed air is drawn through said intake means and lading on opposite sides of said hood is drawn through the spaces between said lower edges and the upper surface of said gate and is entrained thereby and carried out of said exhaust means.

12. In combination, a load containing hopper for the downward flow of lading, a floor forming a bottom for said hopper, means movably mounting said floor on said hopper to permit discharge of the lading by gravity therefrom, an inverted generally U-shaped hood extending transversely of said hopper above said floor, air inlet means connected to said hood, air and lading exhaust means connected to one end of said hood, the lower edge of at least a portion of one of the walls of said hood being spaced from said floor whereby the lading flows through the space between the lower edge portion and said floor and out of said exhaust means on application of suction, and means movably mounting said wall portion relative to the remaining wall portion to shift the position of said lower edge portion with respect to said hopper to increase the size of the opening through which lading is discharged by gravity when the floor is moved to permit such discharge.

13. In combination, a load containing hopper for the downward flow of lading, a floor forming a bottom for said hopper, an inverted generally U-shaped hood extending transversely of said hopper above said floor, air inlet means connected to said hood, and air and lading exhaust means connected to one end of said hood, the lower edge of at least a portion of one of the walls of said hood being spaced from said floor whereby the lading flows through the space between the lower edge portion and said floor and out of said exhaust means on application of suction, and means movably mounting said floor on said hopper to permit access to the interior of said hood.

14. In combination, a load containing hopper for the downward flow of lading, a floor forming a bottom for said hopper, an inverted generally U-shaped hood extending transversely of said hopper above said floor and dividing said hopper into two sections to present hopper sections on opposite sides of said hood, air inlet means connected to said hood, air and lading exhaust means connected to one end of said hood, the lower edge of at least a portion of each of the walls of said hood being spaced from said floor whereby the lading flows through the space between each lower edge portion and said floor and out of said exhaust means on application of suction, and means movably mounting said floor on said hopper to open the bottoms of said hopper sections and allow the lading to flow downwardly by gravity therefrom.

15. In combination, a load containing hopper for the downward flow of lading, a floor forming a bottom for said hopper, means movably mounting said floor on said hopper to permit discharge of the lading by gravity therefrom, an inverted generally U-shaped hood extending transversely of said hopper above said floor and dividing said hopper into two sections to present hopper sections on opposite sides of said hood, air inlet means connected to said hood, air and lading exhaust means connected to one end of said hood, the lower edge of at least a portion of each of the walls of said hood being spaced from said floor whereby the lading flows through the space between each lower edge portion and said floor and out of said exhaust means on application of suction, means hingedly interconnecting said wall portions along the upper edges thereof for movement toward and away from each other to shift the position of each lower edge portion with respect to said hopper to increase the size of the openings through which lading is discharged by gravity when the floor is moved to permit such discharge from said hopper sections.

16. In combination, a load containing hopper for the downward flow of lading, a floor forming a bottom for said hopper, an inverted generally U-shaped hood extending transversely of said hopper above said floor and dividing said hopper into two sections to present hopper sections on opposite sides of said hood, air inlet means connected to said hood, air and lading exhaust means connected to one end of said hood, the lower edge of at least a portion of each of the walls of said hood being spaced from said floor whereby the lading flows through the space between each lower edge portion and said floor and out of said exhaust means on application of suction, means hingedly interconnecting said wall portions along the upper edges thereof for movement toward and away from each other to shift the position of each lower edge portion with respect to said hopper to increase the size of the openings through which lading is discharged by gravity when the floor is moved to permit such discharge from said hopper sections, and means movably mounting said floor on said hopper to permit access to the interior of said hood and open the bottoms of said hopper sections and allow the lading to flow downwardly by gravity therefrom.

17. In combination, a load containing hopper for the downward flow of lading, an inverted generally U-shaped hood extending transversely of said hopper and upwardly into the lading space and providing a vacuum chamber, means providing for the intake of air to said chamber, means providing for the evacuation of air and lading from said chamber, a floor forming the bottom of said chamber, means providing a passageway underneath said hood between said hopper and said chamber whereby lading can flow from said hopper to said floor, and means movably mounting said floor to allow the lading to flow downwardly by gravity.

References Cited in the file of this patent

UNITED STATES PATENTS

| | | |
|---|---|---|
| 387,091 | Mahedy | July 31, 1888 |
| 2,110,262 | Curtis | Mar. 8, 1938 |
| 2,650,726 | Aller et al. | Sept. 1, 1953 |
| 2,695,196 | Talmey et al. | Nov. 23, 1954 |
| 2,745,563 | Dath | May 15, 1956 |
| 2,858,165 | Oliver | Oct. 28, 1958 |